United States Patent

Hunter

Patent Number: 5,762,108
Date of Patent: Jun. 9, 1998

[54] HOSE

[75] Inventor: Neil Edwin Hunter, Farnham, England

[73] Assignee: Earlex Limited, Godalming, England

[21] Appl. No.: 547,619

[22] Filed: Oct. 24, 1995

[30] Foreign Application Priority Data

Oct. 24, 1994 [GB] United Kingdom ............ 9421355

[51] Int. Cl.$^6$ ............................................. F16L 9/00
[52] U.S. Cl. ............... 138/109; 138/113; 138/114; 138/122; 285/242
[58] Field of Search ................ 138/109, 113, 138/114, 118, 121, 122; 285/133.11, 242

[56] References Cited

U.S. PATENT DOCUMENTS

| | | | |
|---|---|---|---|
| 3,831,635 | 8/1974 | Burton | 138/114 |
| 4,349,049 | 9/1982 | Silvey | 138/114 X |
| 4,508,367 | 4/1985 | Oreopoulos et al. | 138/109 X |
| 4,754,782 | 7/1988 | Grantham | 138/109 X |
| 4,922,971 | 5/1990 | Grantham | 138/113 X |
| 5,069,253 | 12/1991 | Hadley | 138/121 X |
| 5,203,378 | 4/1993 | Williams | 138/109 |
| 5,285,744 | 2/1994 | Grantham et al. | 138/114 X |
| 5,299,836 | 4/1994 | Mogavero | 285/133.1 |
| 5,413,147 | 5/1995 | Moreiras et al. | 138/121 X |
| 5,456,502 | 10/1995 | Sharp | 138/114 X |

FOREIGN PATENT DOCUMENTS

| | | |
|---|---|---|
| 0564990 | 10/1993 | European Pat. Off. . |
| 0606028 | 7/1994 | European Pat. Off. . |
| 257158 | 4/1964 | Netherlands ............ 138/109 |

*Primary Examiner*—Patrick F. Brinson
*Attorney, Agent, or Firm*—Ware, Fressola, Van Der Sluys & Adolphson LLP

[57] ABSTRACT

A hose has an inner wall 1 of blow moulded tube and an outer wall 2 of continuous, spirally formed, corrugated tube. At each end of the hose, the inner wall extends further than the outer wall. The walls are separated by a rigid spacer 3 inserted into the end of the outer tube. The walls are united to a moulded connection member 4. This arrangement has a relatively long spigot 5 which extends from a cavity 6. The inner wall is slid onto the spigot as far as the bottom 8 of the cavity. A radially parting mould is placed around the connection member at a nose 9, within which the cavity extends. The mould has an aperture for the outer wall. On injection of material into the mould, the moulding 7 is formed in the cavity 6, along the extent of the inner wall on the spigot 5 as far as the spacer 3 and past the end 10 of this along an end portion 11 of the outer wall. The mould forms the outer diameter of the moulding to the dimension of the nose 9 and limits it from extending along the outside of the outer wall. The spacer limits the moulding from extending inside the outer tube and outside the inner wall. Due to its intimate contact with the walls 1,2 and the connection member 4, the moulding 7 fixes and seals the inner wall to the connection member and fixes the outer wall to the connection member.

19 Claims, 3 Drawing Sheets

HOSE

TECHNICAL FIELD

The present invention relates to a hose, in particular though not exclusively for conducting steam from a boiler to a household tool.

BACKGROUND OF THE INVENTION

Steam wallpaper strippers require steam to be conducted from a boiler to a "wall plate", which is held against the wall for dampening of the wallpaper in preparation for scraping off the wall. The hose used for conducting the steam should resist kinking, collapse under reasonable weight and remain relatively cold to handle. Failure to meet these objectives can cause hazard to the user.

Conventionally thick, single wall rubber tubes have been used. These hoses meet some of the objectives, but are not cool to handle.

SUMMARY OF THE INVENTION

The object of the invention is to provide an in improved hose.

According to one aspect of the invention there is provided a hose having a pair of end fittings adapted for connection of the hose in use, the hose comprising:
  an outer wall;
  an inner wall having an external diameter less than the internal diameter of the outer wall;
  each end fitting including:
    a connection member having a spigot extending inside the inner wall of the hose at its end,
    a spacer radially spacing the outer wall from the inner wall at the end of the hose and
    a moulding of plastics material formed at the respective ends of both walls of the hose to unite them to each other and the connection member.

Whilst it is envisaged that the inner wall may be the same length as the outer wall with moulding material permeating along the inside of the outer wall and the outside of the inner wall, thereby uniting these components to themselves and the moulding, it is preferred that the inner wall extends beyond the spacer at the spigot and that the moulding extends over an end section of the outer wall, whereby the moulding is formed directly onto the inner and outer walls for attachment to them. Further, the connection member, particularly where it is of metal, preferably incorporates surface formations for keying the moulding to the member.

Preferably, the hose walls are of spirally formed, corrugated and/or of blow moulded plastics material.

The connection members can be of moulded plastics material or of metal. In either case, the moulding uniting the hose may be limited at one side—opposite from the hose—by the connection member or by a mould part during moulding and being free after moulding. The other side will normally be limited by a mould part; although where the outer wall is not circularly cylindrical, particularly when spiral and corrugated, a gap will exist between the mould part and the outer wall where some plastics material can extrude during the moulding process.

Conveniently, the uniting moulding will extend into a recess in the connection member where this is of plastics material. This arrangement allows the spigot to be relatively long and avoids ingress of the molten plastics inside the inner wall. Where the spigot is relatively short, it may be provided with an O-ring or other seal at the mouth of the inner wall to avoid the ingress.

The connection member may be adapted for its connection to other apparatus. Alternatively it may carry a further member adapting it for its connection to other apparatus.

In the preferred embodiment, both walls are of polypropylene, as is the spacer and one of the connection members. However other plastics material may be used for any of these items.

According to another aspect of the invention there is provided a method of forming the fittings of the hose of the first aspect, the method consisting in the steps of:
  placing the inner wall inside the outer wall;
  inserting the spacers between the respective walls at their ends;
  inserting the spigots of the connection members into the mouths of the inner wall at their ends;
  arranging the assembly of the walls, spacer and connection member for one end of the hose into a mould defining by a cavity the shape of the moulding with the outer wall extending to one side of the mould and the connection member extending to the other side of the mould;
  injecting plastics material into the mould to form the moulding; and
  repeating the previous two steps for the other end of the hose.

Preferably, where the connection member is axially open, a rod is inserted through the connection member prior to moulding for holding the member open during moulding. The rod is withdrawn after moulding. Use of the rod enables the connection member's spigot to be shorter than it might otherwise be for reliably ensuring that moulding material does not close the inner wall.

BRIEF DESCRIPTION OF THE DRAWINGS

To help understanding of the invention, a specific embodiment thereof will now be described by way of example and with reference to the accompanying drawings, in which.

BEST MODE FOR CARRYING OUT THE INVENTION

Figure 1:
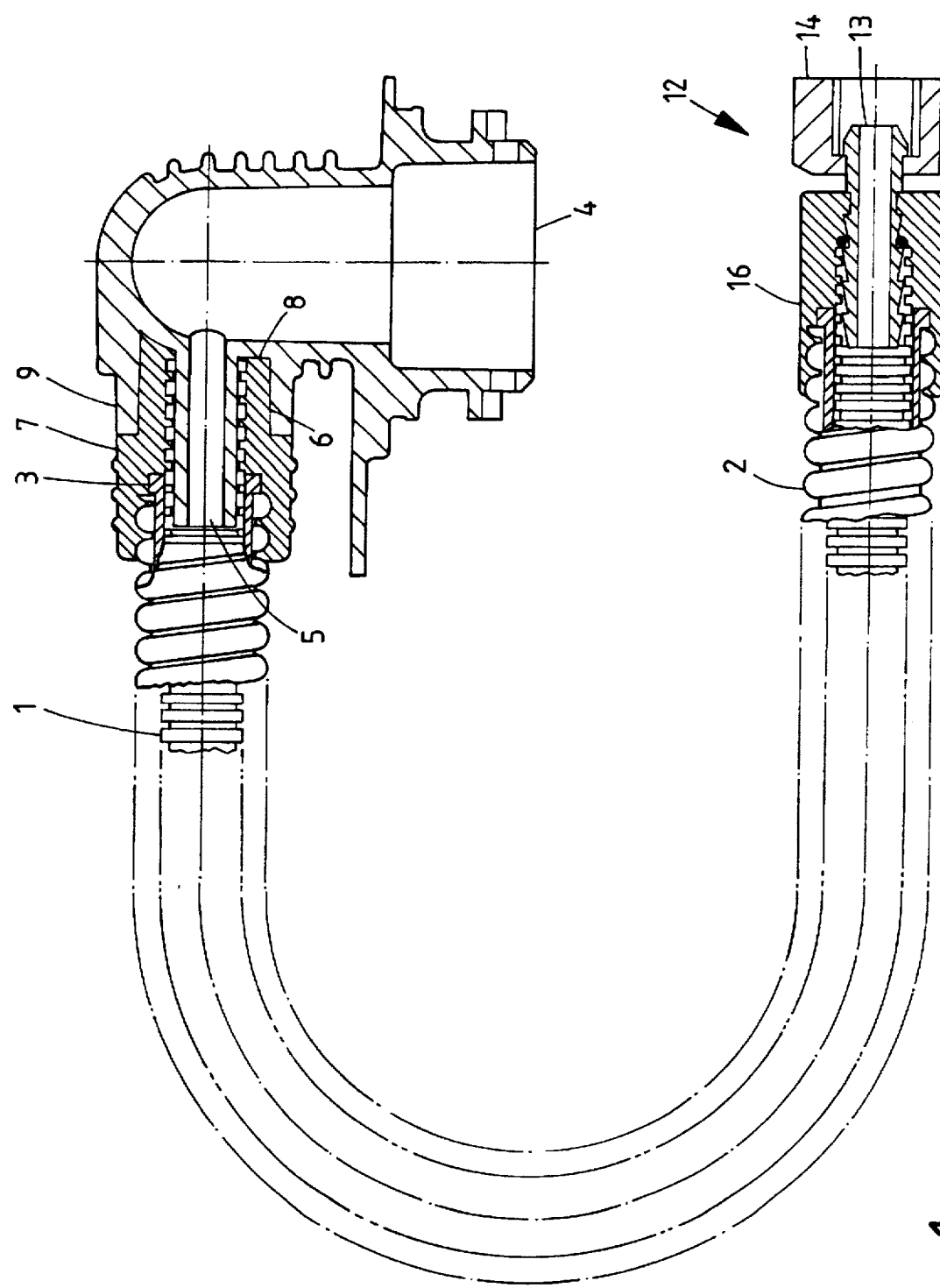
FIG. 1 is a partially sectioned, broken view of a hose of the invention.
Figure 2:
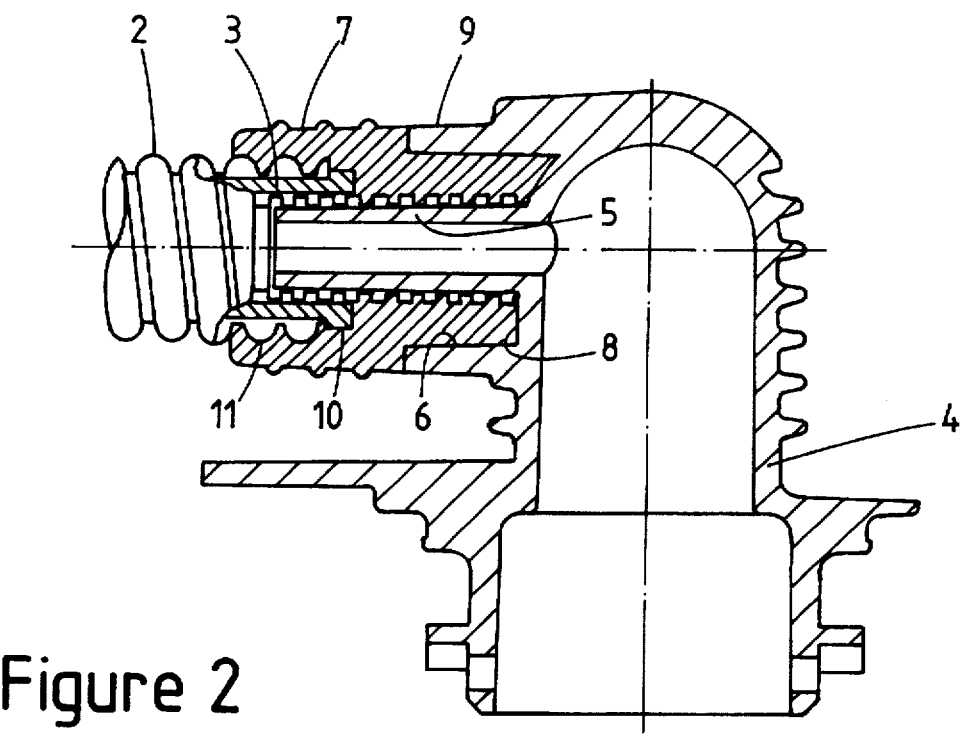
FIG. 2 is a similar view of one hose end fitting on a larger scale.

The hose as such consists of an inner wall 1 of blow moulded tube and an outer wall 2 of continuous, spirally formed, corrugated tube. This form of tube gives the outer wall 2 greater crush resistance than the inner wall 1 has as a blow moulding. Both walls are of polypropylene. They are available from Plastiflex (UK) Limited, Normanton, West Yorkshire, WF6 1TB, England.

At each end of the hose, the inner wall extends further than the outer wall. The walls are separated by a rigid spacer 3 inserted into the end of the outer tube. The spacer holds the walls locally concentric.

At one end, the walls 1,2 are united to a moulded connection member 4. This has a relatively long spigot 5 which extends from a cavity 6. To form a uniting moulding 7, the inner wall is slid onto the spigot as far as the bottom 8 of the cavity. A radially parting mould—not shown—is placed around the connection member at a nose 9, within which the cavity extends. The mould has an aperture for the outer wall. On injection of material into the mould, the moulding 7 is formed in the cavity 6, along the extent of the inner wall on the spigot 5 as far as the spacer 3 and past the end 10 of this along an end portion 11 of the outer wall. The mould forms the outer diameter of the moulding to the dimension of the nose 9 and limits it from extending along the outside of the outer wall. The spacer limits the moulding from extending inside the outer tube and outside the inner wall. Due to its intimate contact with the walls 1,2 and the connection member 4, the moulding 7 fixes and seals the inner wall to the connection member and fixes the outer wall to the connection member.

At the other end of the hose the walls 1,2 are united to a fitting 12 comprised of a metal union tube 13 and a plastics material nut 14. The arrangement is essentially similar to that for the connection member 4, except as follows. The tube 13 is relatively short and provided with saw tooth external grooves 15 and a plain groove 15' to provide for keyed, rigid attachment to a moulding 16 analogous to the moulding 7. At the end 17 of the inner wall, an O-ring 18 is provided to seal the inner wall to the tube 13. On formation of the moulding 16, its mould—shown in FIG. 4—limits both ends of the moulding 16, having an aperture for the tube 13. The nut 14 must of course be fitted to the tube 13 before the moulding 16 is formed.

Figure 4:
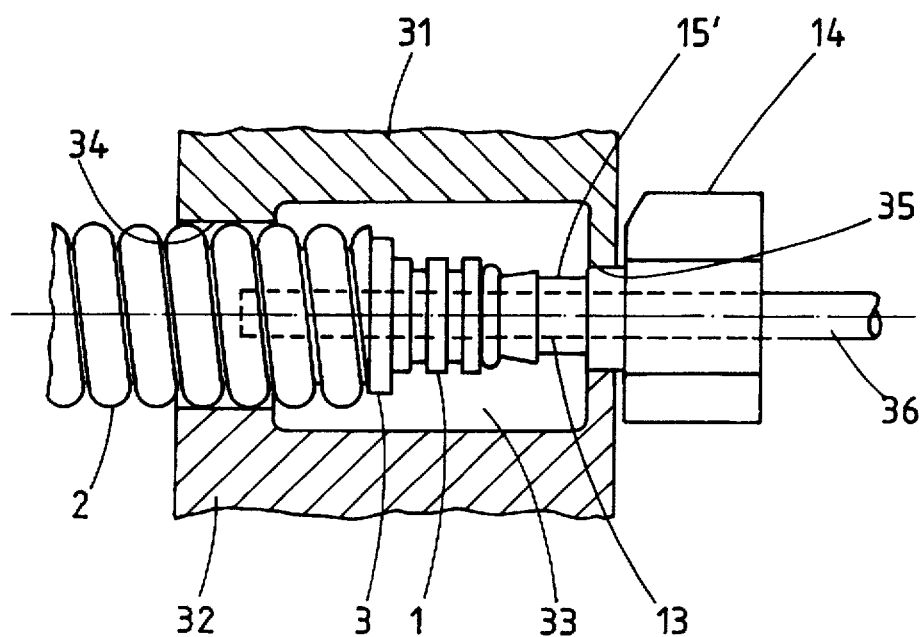
FIG. 4 is a diagrammatic view of the moulding process for forming the end fitting of FIG. 3.

Turning now to FIG. 4, the assembly of the hose and union parts are shown in the mould before injection of the material for the moulding 16. The mould has two parts 31, 32 with a joint plane coincident with the centre of the hose at the fitting being made. The mould parts define a cavity 33 to be filled by the moulding 16 between two apertures 34,35 on the fitting axis. These apertures are sized to locate respectively the outer wall 2, the inner wall 1 and the spacer 3 on the one side and the tube 13 on the other hand. The apertures 34,35 fit the outer wall 2 and tube 13 sufficiently closely to prevent egress of plastics material forming the moulding 16 on injection of the material. To avoid any possibility of the material blocking the hose, in the event of excessive injection pressure forcing the material past the O-ring, a rod 36 is arranged inside the tube 13 and extends beyond its inner end. The rod keeps the end of the tube clear and is withdrawn after the injection process.

The finished hose not only exhibits the structural properties of the walls as such, but having an air gap between the walls is cool to handle. Further, in the unlikely event of the inner wall becoming punctured—without the outer wall also being punctured—low pressure in the hose is retained by the uniting of the walls by its mouldings. Further puncturing of the outer wall alone does lead to loss of pressure tightness of the hose.

Figure 3:
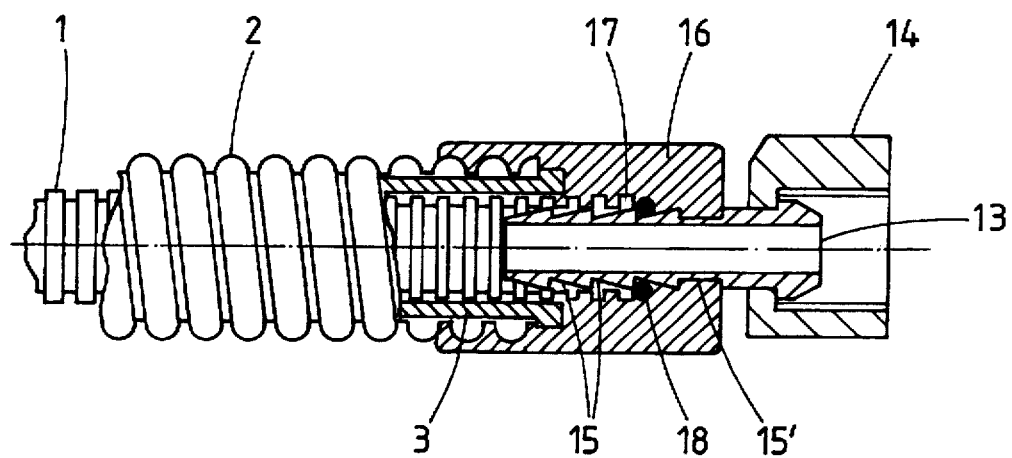
FIG. 3 is a similar view of the other hose end fitting on the larger scale.

It should be noted that the invention is not intended to be restricted to the details of the above described embodiment. In particular, it is applicable to hoses having different wall constructions. For instance the outer wall may be of spirally reinforced continuously extruded tube. Further, the hose can incorporate the same end fittings at both ends, typically of the nut-union type shown in FIG. 3.

I claim:

1. A hose having a pair of end fittings adapted for connection of the hose in use, the hose comprising:

an outer wall having an internal diameter;
an inner wall having an external diameter less than the internal diameter of the outer wall;
each end fitting including:
　a connection member having a spigot extending inside the inner wall of the hose at its end,
　a spacer radially spacing the outer wall from an inner wall at an end of the hose, and
　a moulding of plastics material formed at respective ends of both walls of the hose to unite them to each other and the connection members;
wherein the inner wall extends beyond the outer wall at the spigot and the moulding extends over an end section of the outer wall, whereby the moulding is formed directly onto the inner wall and the outer wall for attachment thereto.

2. A hose according to claim 1, wherein the connection member incorporates surface formations for keying the moulding to the member.

3. A hose according to claim 1, wherein the inner and outer walls are spirally formed.

4. A hose according to claim 1, wherein the connection member is of plastics material.

5. A hose according to claim 1, wherein the connection member is of metal.

6. A hose according to claim 1, wherein the moulding is limited to its side opposite from the hose walls by the connection member.

7. A hose according to claim 6, wherein the moulding extends into a recess in the connection member on its side opposite from the hose walls.

8. A hose according to claim 1, wherein the moulding is free on its side opposite from the hose walls, having been limited on this side during moulding by a mould.

9. A hose according to claim 1, including a seal on each spigot at a respective end of each inner wall to inhibit ingress of moulding material.

10. A hose according to claim 1, wherein the connection member is adapted for its connection to other apparatus.

11. A hose according to claim 1, wherein the connection member carries a further member adapting it for its connection to other apparatus.

12. A method of forming the fittings of a hose having an outer wall and an inner wall having an external diameter less than the internal diameter of the outer wall, and each end fitting having a connection member having a spigot extending inside the inner wall of the hose at its end, a spacer radially spacing the outer wall from the inner wall at the end of the hose and a moulding of plastics material formed at the respective ends of both walls of the hose to unite them to each other and the connection member, the method consisting in the steps of:

placing the inner wall inside the outer wall;
inserting the spacers between the respective walls at their ends;
inserting the spigots of the connection members into the mouths of the inner walls at their ends;
arranging the assembly of the walls, spacer and connection member for one end of the hose into a mould defining by a cavity the shape of the moulding with the outer wall extending to one side of the mould and the connection member extending to the other side of the mould;

injecting plastics material into the mould to form the moulding; and repeating the two previous steps for the other end of the hose.

13. A method according to claim 12, the connection member being axially open, the method including insertion of a rod through the connection member prior to moulding for holding the member open during moulding and withdrawing the rod after moulding.

14. A hose according to claim 1, wherein the inner and outer walls are corrugated.

15. A hose according to claim 1, wherein the inner and outer walls are formed of blow moulded plastics material.

16. A hose according to claim 1, wherein the inner and outer walls are spirally formed of blow moulded plastics material.

17. A hose according to claim 1, wherein the inner and outer walls are corrugated and formed of blow moulded plastics material.

18. A hose according to claim 1, wherein the inner and outer walls are spirally formed, corrugated and of blow moulded plastics material.

19. A hose according to claim 1, wherein the inner and outer walls are spirally formed and corrugated.

* * * * *